United States Patent [19]
Carpenter

[11] Patent Number: 6,150,745
[45] Date of Patent: Nov. 21, 2000

[54] MAGNETIC SYSTEM FOR CONTROLLING THE POSITION OF A FISHING REEL SPOOL

[75] Inventor: Robert Leon Carpenter, Tulsa, Okla.

[73] Assignee: Brunswick Corporation, Tulsa, Okla.

[21] Appl. No.: 09/307,622

[22] Filed: May 7, 1999

[51] Int. Cl.[7] .................................................. H02K 7/09
[52] U.S. Cl. ..................... 310/90.5; 242/599.3; 242/280; 242/321
[58] Field of Search ............................ 310/905; 242/288, 242/321, 376.1, 899, 599.3

[56] References Cited

U.S. PATENT DOCUMENTS

| | | | |
|---|---|---|---|
| 2,528,271 | 10/1950 | Gibbs et al. | 242/288 |
| 3,934,833 | 1/1976 | Nash et al. | 242/530.3 |
| 4,516,739 | 5/1985 | Wyatt | 242/155 M |
| 4,544,111 | 10/1985 | Nakajima | 242/288 |
| 4,580,742 | 4/1986 | Mooseberg et al. | 242/288 |
| 4,585,183 | 4/1986 | Puryear | 242/288 |
| 4,585,188 | 4/1986 | Sato et al. | 242/261 |
| 4,593,866 | 6/1986 | Mooseberg et al. | 242/288 |
| 4,674,699 | 6/1987 | Fukushima et al. | 242/261 |
| 4,799,814 | 1/1989 | Okubo et al. | 400/639.1 |
| 5,556,048 | 9/1996 | Hashimoto | 242/288 |
| 5,636,804 | 6/1997 | Jeung | 242/288 |
| 5,986,373 | 11/1999 | Stucker | 310/90.5 |
| 6,010,092 | 1/2000 | Holzer, Jr. et al. | 242/599.3 |

FOREIGN PATENT DOCUMENTS

| | | |
|---|---|---|
| 37330 | 2/1984 | Japan . |
| 113317 | 6/1984 | Japan . |
| 241518 | 11/1985 | Japan . |
| 09205952 | 8/1997 | Japan . |

*Primary Examiner*—Nestor Ramirez
*Assistant Examiner*—Joseph Waks
*Attorney, Agent, or Firm*—Wood, Phillips, VanSanten, Clark & Mortimer

[57] ABSTRACT

A fishing reel is provided having a frame and an operating mechanism on the frame. The operating mechanism includes a line carrying spool that is mounted on the frame for rotation around a first axis. The frame has first and second frame parts spaced axially relative to the first axis. The line carrying spool has a shaft with a first end that is supported for rotation on the first frame part. The operating mechanism includes a first magnet on the first frame part and a second magnet on the spool. The first and second magnets are arranged to one of a) attract and b) repel each other to thereby exert a force on the spool and urges the spool axially relative to the frame as the spool is rotated.

24 Claims, 2 Drawing Sheets

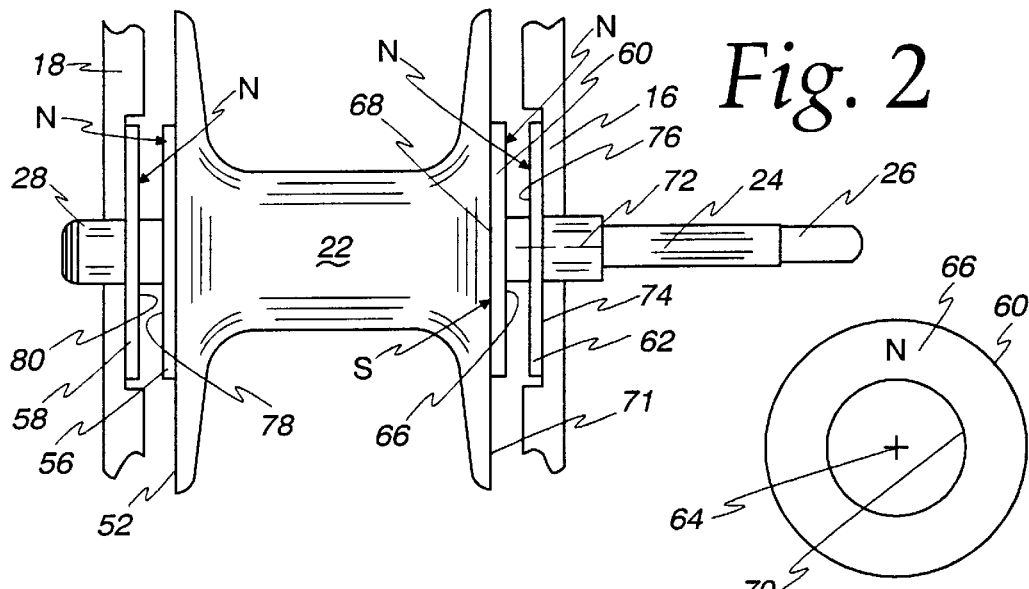
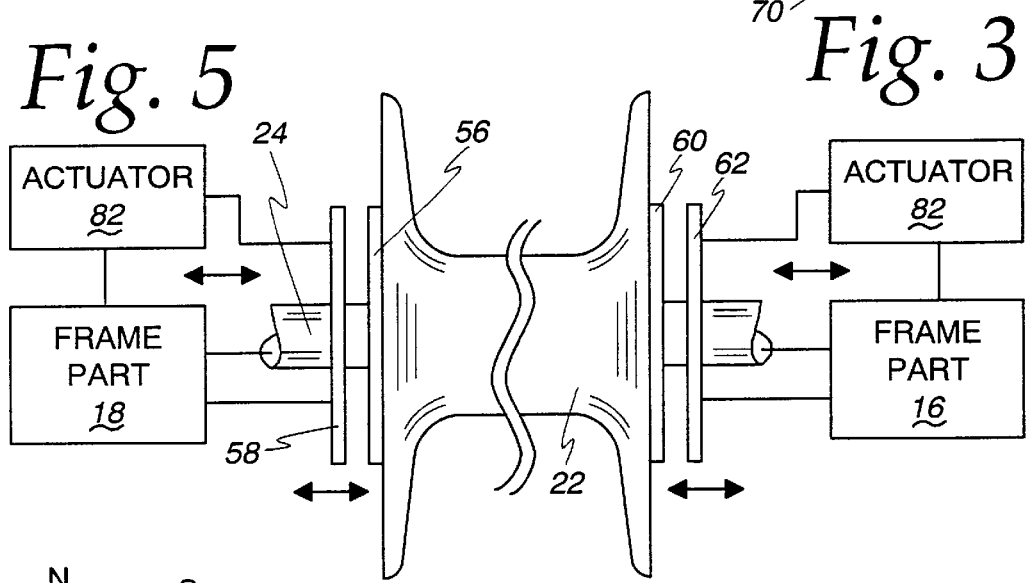
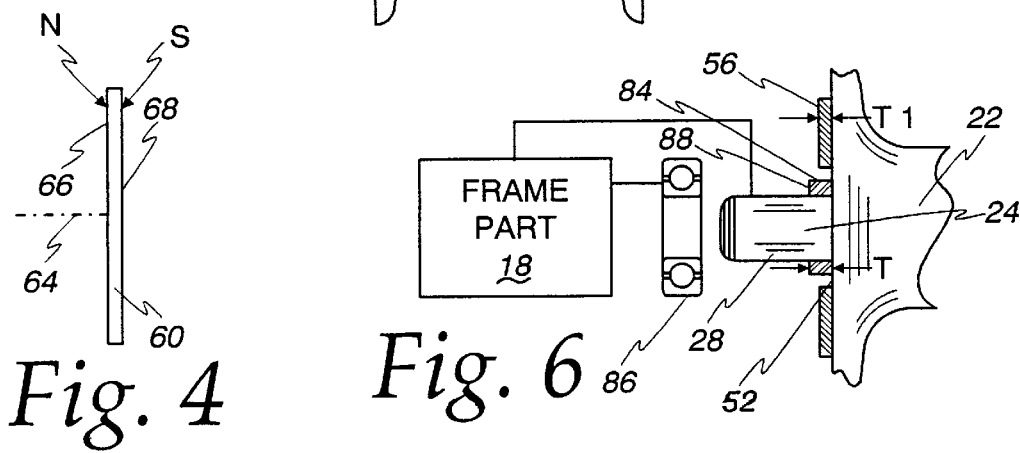

MAGNETIC SYSTEM FOR CONTROLLING THE POSITION OF A FISHING REEL SPOOL

BACKGROUND OF THE INVENTION

1. Field of the Invention

This invention relates to fishing reels of the type having a line carrying spool that is rotatable about an axis and, more particularly, to structure for maintaining the spool in a desired axial position.

2. Background Art

Baitcast type fishing reels utilize a spool with spaced ends that are supported upon a frame for rotation around a laterally extending axis. Ideally, frictional resistance to spool rotation is minimized to maximize reel performance. To achieve this end, a modicum of lateral shifting is commonly allowed so that the spool does not bind with the frame. Ideally, for smoothest operation, the spool would be allowed to shift slightly laterally while at the same time remaining centered during operation. To the knowledge of the inventor, no such structure is currently available to permit this.

SUMMARY OF THE INVENTION

In one form of the invention, a fishing reel is provided having a frame and an operating mechanism on the frame. The operating mechanism includes a line carrying spool that is mounted on the frame for rotation around a first axis. The frame has first and second frame parts spaced axially relative to the first axis. The line carrying spool has a shaft with a first end that is supported for rotation on the first frame part. The operating mechanism includes a first magnet on the first frame part and a second magnet on the spool. The first and second magnets are arranged to one of a) attract and b) repel each other to thereby exert a force on the spool that urges the spool axially relative to the frame as the spool is rotated.

The fishing reel may further include a third magnet on the second frame part and a fourth magnet on the spool with the third and fourth magnets arranged to one of a) attract and b) repel each other to thereby exert an axial force on the spool as the spool is rotated. The force exerted on the spool by the first and second magnets and the force exerted on the spool by the third and fourth magnets cooperate to cause the spool to be consistently urged axially relative to the frame to a predetermined position.

The shaft may have a second end that is supported for rotation on the second frame part.

In one form of the invention, a fishing reel is provided having a frame and an operating mechanism on the frame. The operating mechanism includes a line carrying spool that is mounted on the frame for rotation around a first axis, a first magnet on the frame, and a second magnet mounted on the spool to rotate with the spool. The first and second magnets are arranged to one of a) attract and b) repel each other to thereby exert an axial force on the spool as the spool is rotated.

In one form, at least one of the first and second magnets extends continuously around the first axis.

A third magnet can be provided on the frame with a fourth magnet mounted on the spool for rotation with the spool, with the third and fourth magnets being arranged to one of a) attract and b) repel each other to thereby exert an axial force on the spool as the spool rotates.

In one form, the frame has axially spaced frame parts and the first magnet is on one of the spaced frame parts and the third magnets is on the other of the spaced frame parts.

In one form, the first and second magnets are spaced axially relative to each other and structure is provided on at least one of the frame and spool for selectively repositioning one of the first and second magnets axially relative to the other of the first and second magnets to thereby vary the axial spacing between the first and second magnets.

The fishing reel may further include spacing structure on at least one of the frame and spool for preventing the first magnet from contacting the second magnet.

In one form, the spool has an axially facing flat surface and the second magnet is on the axially facing flat spool surface.

In one form, each of the first, second, and third magnets extends continuously around the first axis.

In another form of the invention, a fishing reel is provided having a frame with first and second laterally spaced frame parts and an operating mechanism on the frame. The operating mechanism includes a line carrying spool that is mounted to the frame for rotation around a first axis extending laterally through the first and second frame parts. The operating mechanism further includes a first structure for generating a magnetic force between the first frame part and the spool and a second structure for generating a magnetic force between the second frame part and the spool.

The spool may have a first laterally facing surface adjacent the first frame part and a second laterally facing surface adjacent the second frame part, with the first structure including a first magnet on one of the first frame part and first laterally facing surface that generates one of a) an attractive force and b) a repulsive force between the first frame part and first laterally facing spool surface and the second structure includes a second magnet on one of the second frame part and second laterally facing spool surface that generates one of a) an attractive force and b) a repulsive force between the second frame part and the second laterally facing spool surface.

The first structure may include a third magnet on the other of the first frame part and first laterally facing surface that cooperates with the first magnet to produce one of a) an attractive force and b) a repulsive force between the first frame part and the first laterally facing spool surface. Similarly, the second structure may include a fourth magnet on the other of the second frame part and second laterally facing spool surface that cooperates with the second magnet to produce one of a) an attractive force and b) a repulsive force between the second frame part and second laterally facing spool surface.

In one form, the operating mechanism has a bearing on the frame to contact the spool and guide rotation of the spool around the first axis and a spacing element is interposed directly between the first laterally facing surface of the spool and the bearing to prevent the first magnet from contacting the third magnet.

In another form of the invention, a fishing reel is provided having a frame with first and second laterally spaced frame parts and an operating mechanism on the frame. The operating mechanism includes a line carrying spool that spans between the first and second frame parts and is mounted on the first and second frame parts for rotation around a first axis. First structure is provided on the frame for generating a magnetic force between each of the first and second frame parts and the spool that biasably maintains the spool in a desired lateral position relative to the first and second frame parts.

The first structure may include structure for selectively varying the magnetic force applied between at least one of the first and second frame parts and the spool. The magnetic force between each of the first and second frame parts and spool may be varied.

BRIEF DESCRIPTION OF THE DRAWINGS

FIG. 2 is a fragmentary, schematic, plan view of a fishing reel as in FIG. 1 with a magnetic spool control system, according to the present invention, incorporated therein;

FIG. 3 is a side elevation view of a magnet on the inventive spool control system of FIG. 2;

FIG. 4 is an end elevation view of the magnet of FIG. 3;

FIG. 5 is a schematic representation of a modified form of magnetic spool control system, according to the present invention, wherein the magnetic force generating between the frame and the spool can be selectively varied; and FIG. 6 is an exploded, fragmentary end view of a modified form of magnetic spool control system, according to the present invention, including a spacer element to limit lateral shifting of the spool.

DETAILED DESCRIPTION OF THE DRAWINGS

Figure 1:
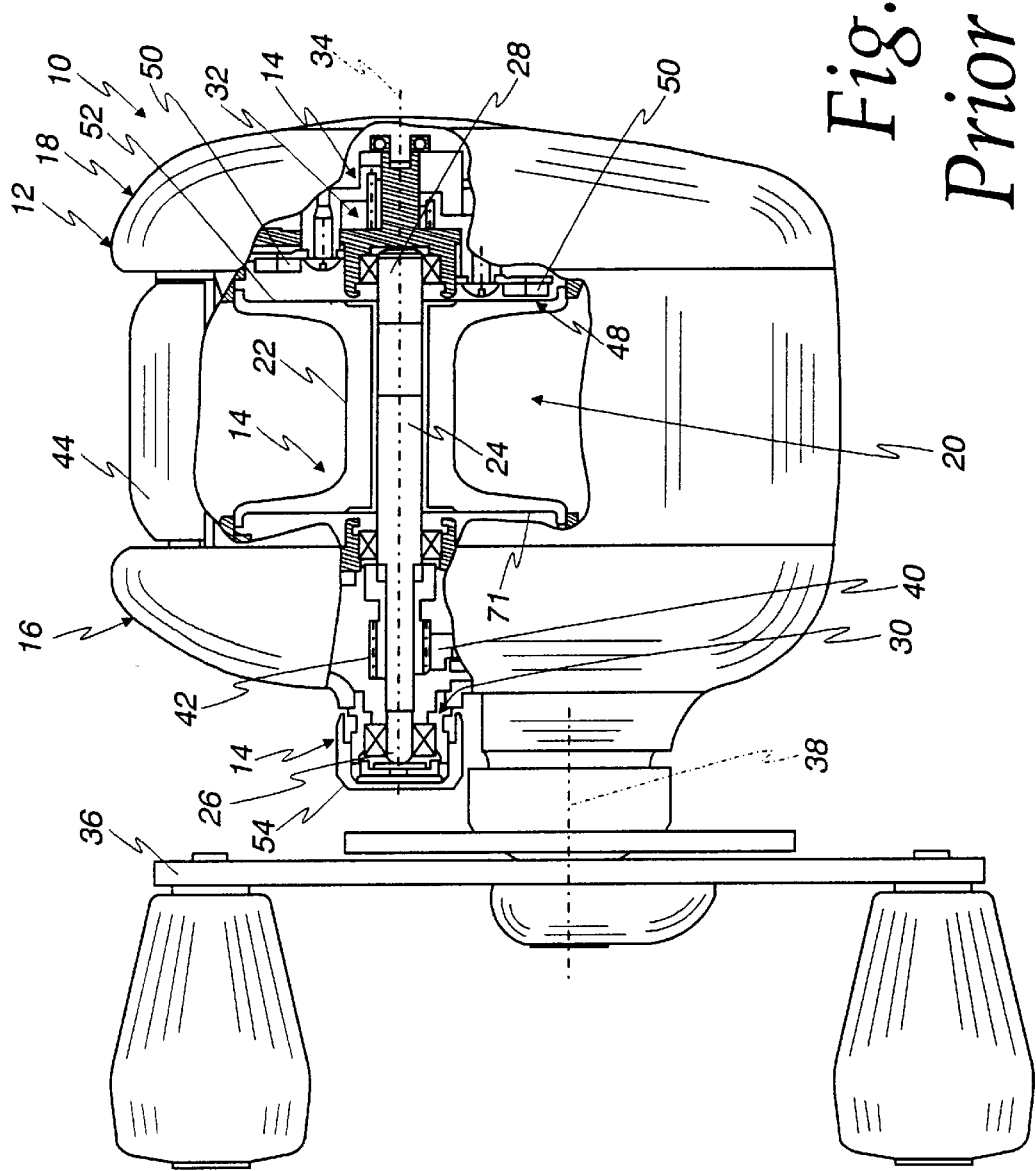
FIG. 1 is a plan view of a conventional fishing reel with a rotatable spool thereon that is exemplary of one environment suitable for incorporation of the present invention.

In FIG. 1, a prior art fishing reel, suitable for incorporation of the present invention, is shown at 10. The fishing reel 10 is of the type commonly referred to in the industry as a baitcast fishing reel. The fishing reel 10 has a frame 12 on which an operating mechanism 14 is mounted. The frame 12 includes laterally spaced frame parts 16, 18 which cooperatively bound a line storage space 20. A line carrying spool 22 spans the frame parts 16, 18 through the space 20. The spool 22 has a shaft 24 which extends into the frame parts 16, 18. The shaft 24 has axially spaced ends 26, 28 that are supported by bearing assemblies 30, 32 on the frame parts 16, 18, respectively, so that the spool 22 is rotatable about a laterally extending axis 34.

Line is retrieved onto the fishing reel 10 by rotating the spool 22 through a crank handle 36. The crank handle 36 in turn rotates a drive shaft 38 which is frictionally keyed to a drive gear 40 that is in mesh with a gear 42 keyed to the spool shaft 24. With the fishing reel 10 in a retrieve state, rotation of the crank handle 36 rotates the spool 22 around the axis 34 to thereby wrap line onto the spool 22.

By operating an actuator 44, the fishing reel 10 is changed from its retrieve state into its cast state. There are a number of different prior art mechanisms through which this can be accomplished. In one form, the actuator 44, through a cam plate (not shown), laterally repositions, and thereby disengages, the gear 42 from the drive gear 40 so that the drive connection between the crank handle 36 and shaft 22 is disabled. In this cast state, the spool 22 is freely rotatable to allow line payout.

A magnetic brake assembly 48 has a plurality of disk-shaped magnets 50 thereon which produce a magnetic field within which a flat surface 52, facing laterally towards the frame part 16 operates, to thereby produce a braking force to limit backlash in a manner well known to those skilled in the art. The magnets 50 on the brake assembly 48 are movable selectively axially/laterally towards and away from the spool surface 52 to vary the braking force.

The spool 22 is maintained in a centered position by the captive arrangement of the bearing assemblies 30, 32 on the frame parts 16, 18. A biasing force can be exerted laterally inwardly on the one spool shaft end 26 through a threaded cap 54. By tightening the cap 54, the shaft 24 is squeezed between the bearing assemblies 30, 32 with an increasing force. By tightening the cap 54, lateral "play" for the spool 22 is limited. However, as this occurs, the resistance to rotation of the spool 22 increases.

According to the invention, a magnetic spool control system is incorporated into the reel of FIG. 1 to effect lateral centering of the spool 22 and/or produce a desired braking action on the spool 22. Since the basic structure and operation of the fishing reel 10 are unaltered by the incorporation of the present invention, the invention will be described with respect to the fishing reel 10 of FIG. 1, using corresponding reference numerals, and with reference to the schematic drawings in FIGS. 2–6.

According to the invention, as seen in FIGS. 2–4, cooperating magnets 56, 58, 60, 62 are provided on the frame 12 and spool 22. Each of the magnets 56, 58, 60, 62 has the same construction, with the magnet pairs 56, 58, and 60, 62 cooperating in similar fashion at laterally/axially spaced locations on the spool 22. Exemplary magnet 60 has an annular, disk shape, with a center axis 64 and north and south poles on axially oppositely facing surfaces 66, 68.

To place the magnet 60 in the operative position of FIG. 2, the spool shaft end 26 is directed through a central opening 70 in the magnet 60 until the surface 68 is facially abutted to the laterally facing spool surface 71. The magnet 60 can be suitably secured to the spool surface 71, as by an adhesive, or other means well known to those skilled in the art.

The magnet 62 is mounted to the frame part 16 with its central axis 72 coaxial with the axis 64 of the magnet 60. With this arrangement, the spool shaft end 26 is allowed to extend fully through the magnet 62 into the bearing assembly 30.

The oppositely facing surfaces 66, 68 on the magnet 60 have opposite polarity, with the oppositely facing surfaces 74, 76 on the magnet 62 likewise having opposite polarity. The magnets 60, 62 are mounted so that the surfaces 66, 76 with like poles face each other. As a result, a repulsive force is produced between the magnet 60, 62, urging the spool 22 laterally/axially towards the left in FIG. 2.

The magnet 56 is mounted to the laterally spacing spool surface 52 and the magnet 58 mounted to the frame part 18 in coaxial relationship in a similar fashion so that the shaft end 28 extends fully through the magnets 56, 58 and into the bearing assembly 32. With the magnets 56, 58 in operative position, the facing surfaces 78, 80 on the magnets 56, 58 have like poles so that there is a repulsive force generated between the magnets 56, 58, and thus the frame part 18 and the spool 22, that biasably urges the spool 22 from left to right in FIG. 2.

The magnets 56, 58, 60, 62 are preferably sized and located so that the force produced between the magnets 60, 62 is equal to the force produced between the magnets 56, 58. Accordingly, the spool is biasably urged towards a centered position. This biasing force is produced by a magnetic field as opposed to direct contact between elements that must relatively move as the spool 22 rotates. The invention thus allows the spool to be mounted in a floating manner for smooth rotation with positive centering that avoids unwanted frictional forces, as in the event that the spool 22 shifts under a lateral force applied by the user.

It should be understood that this same arrangement could be used wherein the poles on the magnet pairs 60, 62 and 56, 58 are arranged so that the magnets in the pairs 56, 58 and 60, 62 attract each other. The shortcoming with this arrangement is that under an applied lateral force, the spool 22 might be shifted so that the spool 22 is drawn into and maintained in an off center relationship with the frame 12. This problem could be overcome by a spacer element as described below.

Another aspect of the invention is the provision of an actuator system 82, as shown in FIG. 5, that allows the magnet 58 on the frame part 18 to be shifted selectively laterally towards and away from the magnet 56 to thereby change the attractive or repulsive force therebetween. The actuator 82 is designed to likewise change the lateral/axial position of the magnet 62 relative to the magnet 60 for the same purpose.

Another aspect of the invention, as seen in FIG. 6, is the use of a spacer element 84 which surrounds the spool shaft 24 and is interposed between the spool surface 52 and a bearing 86 supporting the spool shaft end 28 on the frame part 18. The spacer element 84 has an axial thickness T that is greater than the axial thickness T1 of the magnet 56. Accordingly, the laterally outwardly facing surface 88 on the spacer element abuts to the bearing 86 before the magnet 56 can come into direct contact with the magnet 58 (FIGS. 2 and 5). A spacer (not shown) can also be provided to act between the spool surface 71 and the housing part 16.

By allowing the spacing between the magnets 56, 58 and 60, 62 to be varied, the inventive system can be used not only to laterally center the spool 22 but also to function as a brake assembly to replace the magnetic brake assembly 48 in the prior art reel.

The foregoing disclosure of specific embodiments is intended to be illustrative of the broad concepts comprehended by the invention.

What is claimed is:

1. A fishing reel comprising:

a frame; and an operating mechanism on the frame, said operating mechanism comprising a line carrying spool that is mounted on the frame for rotation around a first axis, said frame having first and second frame parts spaced axially relative to the first axis, the line carrying spool having a shaft with a first end that is supported for rotation on the first frame part, said operating mechanism further comprising a first magnet on the first frame part and a second magnet on the spool, causing the spool to be consistently urged axially relative to the frame to a predetermined position, said first and second magnets being arranged to one of a) attract and b) repel each other to thereby exert a force on the spool that urges the spool axially relative to the frame as the spool is rotated.

2. The fishing reel according to claim 1 wherein there is a third magnet on the second frame part and a fourth magnet on the spool and the third and fourth magnets are arranged to one of a) attract and b) repel each other to thereby exert an axial force on the spool as the spool is rotated, the force exerted on the spool by the first and second magnets and the force exerted on the spool by the third and fourth magnets cooperating to cause the spool to be consistently urged axially relative to the frame to a predetermined position.

3. The fishing reel according to claim 2 wherein the shaft has a second end that is supported for rotation on the second frame part.

4. A fishing reel comprising:

a frame; and an operating mechanism on the frame, said operating mechanism comprising a line carrying spool that is mounted on the frame for rotation around a first axis, said operating mechanism further comprising a first magnet on the frame and a second magnet mounted on the spool to rotate with the spool, said first and second magnets being arranged to one of a) attract and b) repel each other to thereby exert a force on the spool that urges the spool axially relative to the frame as the spool is rotated.

5. The fishing reel according to claim 4 wherein at least one of the first and second magnets extends continuously around the first axis.

6. The fishing reel according to claim 4 wherein there is a third magnet on the frame and a fourth magnet mounted on the spool for rotation with the spool and the third and fourth magnets are arranged to one of a) attract and b) repel each other to thereby exert an axial force on the spool as the spool is rotated, the force exerted on the spool by the first and second magnets and the force exerted on the spool by the third and fourth magnets cooperating to cause the spool to be consistently urged axially relative to the frame to a predetermined position.

7. The fishing reel according to claim 6 wherein the frame comprises axially spaced frame parts and the first magnet is on one of the spaced frame parts and the third magnet is on the other of the spaced frame parts.

8. The fishing reel according to claim 6 wherein each of the first, second and third magnets extends continuously around the first axis.

9. The fishing reel according to claim 6 wherein the first, second, third and fourth magnets are the only structures cooperating between the frame and spool to produce a force to urge the spool in an axial direction relative to the frame.

10. The fishing reel according to claim 4 wherein the first and second magnets are spaced axially relative to each other and including means on at least one of the frame and spool for selectively repositioning one of the first and second magnets axially relative to the other of the first and second magnets to thereby vary the axial spacing between the first and second magnets to thereby vary the force exerted on the spool by the first and second magnets that urges the spool axially.

11. The fishing reel according to claim 4 including spacing means on at least one of the frame and spool for preventing the first magnet from contacting the second magnet.

12. The fishing reel according to claim 4 wherein the spool has an axially facing flat surface and the second magnet is on the axially facing flat spool surface.

13. A fishing reel comprising:

a frame having first and second laterally spaced frame parts; and an operating mechanism on the frame, said operating mechanism comprising a line carrying spool that is mounted to the frame for rotation around a first axis extending laterally through the first and second frame parts, said operating mechanism further comprising a first means for generating one of a) a magnetic attractive force and b) a magnetic repulsive force between the first frame part and the spool and a second means for generating one of a) a magnetic attractive force and b) a magnetic repulsive force between the second frame part and the spool.

14. The fishing reel according to claim 13 wherein the spool has a first laterally facing surface adjacent the first frame part and a second laterally facing surface adjacent the second frame part, the first means comprises a first magnet on one of the first frame part and first laterally facing surface that generates one of a) an attractive force and b) a repulsive force between the first frame part and first laterally facing spool surface and the second means comprises a second magnet on one of the second frame part and second laterally facing spool surface that generates one of a) an attractive force and b) a repulsive force between the second frame part and the second laterally facing spool surface.

15. The fishing reel according to claim 14 wherein the first means comprises a third magnet on the other of the first frame part and first laterally facing surface that cooperates with the first magnet to produce one of a) an attractive force and b) a repulsive force between the first frame part and first laterally facing spool surface.

16. The fishing reel according to claim 15 wherein the second means comprises a fourth magnet on the other of the second frame part and second laterally facing spool surface that cooperates with the second magnet to produce one of a) an attractive force and b) a repulsive force between the second frame part and second laterally facing spool surface.

17. The fishing reel according to claim 15 including means on at least one of the frame and spool for selectively repositioning one of the first and third magnets axially relative to the other of the first and third magnets to thereby selectively vary a magnetic force developed between the first and third magnets to thereby vary the force exerted on the spool by the first and second magnets that urges the spool axially.

18. The fishing reel according to claim 17 wherein there is a spacing means on one of the frame and spool for preventing the first magnet from contacting the third magnet.

19. The fishing reel according to claim 18 wherein the operating mechanism further comprises a bearing on the frame to contact the spool and guide rotation of the spool around the first axis and the spacing means comprises a spacing element that is interposed directly between the first laterally facing surface of the spool and the bearing.

20. The fishing reel according to claim 14 wherein at least one of the first and second magnets extends fully around the first axis.

21. A fishing reel comprising:

a frame having first and second laterally spaced frame parts; and an operating mechanism on the frame, said operating mechanism comprising a line carrying spool that spans between the first and second frame parts and is mounted on the first and second frame parts for rotation around a first axis, said operating mechanism further comprising first means on the frame for generating one of a) a magnetic attractive force and b) a magnetic repulsive force between each of the first and second frame parts and the spool that biasably urges the spool toward a desired lateral position relative to the first and second frame parts.

22. The fishing reel according to claim 21 wherein the first means comprises means for selectively varying a magnetic force generated between at least one of the first and second frame parts and the spool.

23. The fishing reel according to claim 21 wherein the first means comprises means for selectively varying a magnetic force applied between each of the first and second frame parts and the spool.

24. The fishing reel according to claim 21 wherein the first means comprises at least one magnet that extends fully around the first axis.

* * * * *